United States Patent
Ramsay et al.

(10) Patent No.: US 11,695,909 B2
(45) Date of Patent: Jul. 4, 2023

(54) METHOD FOR OBTAINING A THREE-DIMENSIONAL MODEL OF AN INSPECTION SITE

(71) Applicant: Carnegie Robotics, LLC, Pittsburgh, PA (US)

(72) Inventors: Michael Jason Ramsay, Pittsburgh, PA (US); Daniel David Williams, Pittsburgh, PA (US); Anil Harish, Pittsburgh, PA (US); David LaRose, Pittsburgh, PA (US)

(73) Assignee: CARNEGIE ROBOTICS, LLC, Pittsburgh, PA (US)

( * ) Notice: Subject to any disclaimer, the term of this patent is extended or adjusted under 35 U.S.C. 154(b) by 153 days.

(21) Appl. No.: 17/162,509

(22) Filed: Jan. 29, 2021

(65) Prior Publication Data
US 2022/0247993 A1   Aug. 4, 2022

(51) Int. Cl.
*H04N 13/243* (2018.01)
*H04N 13/282* (2018.01)
*G06T 7/00* (2017.01)

(52) U.S. Cl.
CPC ......... *H04N 13/243* (2018.05); *G06T 7/0002* (2013.01); *H04N 13/282* (2018.05); *G06T 2207/10021* (2013.01); *G06T 2207/30168* (2013.01)

(58) Field of Classification Search
CPC .. H04N 13/243; H04N 13/282; G06T 7/0002; G06T 7/70
See application file for complete search history.

(56) References Cited

U.S. PATENT DOCUMENTS

| | | | |
|---|---|---|---|
| 2016/0146971 A1* | 5/2016 | Gerling | G01V 99/00 702/5 |
| 2017/0023492 A1* | 1/2017 | Olsson | H04N 5/345 |
| 2022/0130105 A1* | 4/2022 | Sakamoto | G06T 7/70 |

OTHER PUBLICATIONS

Mulligan et al., "Trinocular Stereo for Non-Parallel Configurations", International Conference on Pattern Recognition, vol. 1, Sep. 5, 2014, pp. 567-570.

* cited by examiner

*Primary Examiner* — Rowina J Cattungal
(74) *Attorney, Agent, or Firm* — Workman Nydegger

(57) ABSTRACT

A method for obtaining a three-dimensional model of an inspection site, using a perception module, is disclosed. The perception module comprises a detection unit, e.g. comprising one or more cameras and/or a three-dimensional laser scanner, configured to obtain a three-dimensional image. At least one three-dimensional image is obtained by means of the detection unit. A three-dimensional model of surroundings of the perception module is created, based on the obtained three-dimensional image. The created three-dimensional model and a plan of the inspection site are compared and features of the created three-dimensional model and features of the plan of the inspection site are matched. A site-specific three-dimensional model of the inspection site is formed, based on the created three-dimensional model and the plan of the inspection site, and based on the comparison.

14 Claims, 17 Drawing Sheets

METHOD FOR OBTAINING A THREE-DIMENSIONAL MODEL OF AN INSPECTION SITE

FIELD OF THE INVENTION

The present invention relates to a method for obtaining a three-dimensional model of an inspection site, using a perception module with a detection unit configured to obtain a three-dimensional image. The method according to the invention is particularly suitable when performing inspections at inspection sites which are not easily accessible, such as underground pipes.

BACKGROUND OF THE INVENTION

When performing inspection at sites which are not readily available for direct visual inspection, e.g. inside pipes, such as sewer pipes, supply pipes, etc., an inspection vehicle is sometimes introduced at the inspection site in order to obtain suitable images of the site. The obtained images are analysed by an operator, e.g. in order to identify and localize cracks or other maintenance requiring features. Subsequently, maintenance or repair may be planned based on the inspection.

In order to plan the maintenance or repair in a suitable manner, it is important that it is possible to retrieve an accurate rendering of the inspected site from the images obtained by the inspection vehicle. This could, e.g., include accurate three-dimensional images of the site.

Furthermore, in order to ensure that a part of the inspected site being in need for maintenance or repair can be appropriately accessed, it is desirable to be able to link the three-dimensional images of the site to well-known positions, e.g. positions above ground.

DESCRIPTION OF THE INVENTION

It is an object of embodiments of the invention to provide a method for obtaining a three-dimensional model of an inspection site, in which features of the inspection site can be accurately localized.

It is a further object of embodiments of the invention to provide a method for obtaining a three-dimensional model of an inspection site, which allows inconveniences in relation to subsequent maintenance or repair to be minimised.

The invention provides a method for obtaining a three-dimensional model of an inspection site, using a perception module, the perception module comprising a detection unit configured to obtain a three-dimensional image, the method comprising the steps of:

obtaining at least one three-dimensional image by means of the detection unit, creating a three-dimensional model of surroundings of the perception module, based on the obtained three-dimensional image(s), comparing the created three-dimensional model and a plan of the inspection site and matching features of the created three-dimensional model and features of the plan of the inspection site, and forming a site-specific three-dimensional model of the inspection site, based on the created three-dimensional model and the plan of the inspection site, and based on the comparison.

Thus, the invention provides a method for obtaining a three-dimensional model of an inspection site. The inspection site may, e.g., be a site which is not readily accessible for visual inspection, e.g. the interior of a pipe, such as a sewer pipe, a supply pipe, etc., which may be arranged underground.

The three-dimensional model of the inspection site is obtained using a perception module. The perception module comprises a detection unit being configured to obtain a three-dimensional image. In the present context the term 'perception module' should be interpreted to mean a module which is configured to perceive details regarding its surroundings. In particular, the perception module applied when performing the method according to the invention is configured to obtain three-dimensional images of its surroundings, by means of the detection unit. The perception module may, e.g., be mounted on or form part of an inspection vehicle, i.e. an apparatus which is capable of moving within a given space or region, in order to perform inspection of the space or region.

In the method according to the invention, at least one three-dimensional image is initially obtained by means of the detection unit. A three-dimensional model of the surroundings of the perception module, e.g. of a site being inspected, is created, based on the obtained three-dimensional image(s). Thereby a model of the surroundings of the perception module is obtained, which includes three-dimensional features of the surroundings.

Next, the created three-dimensional model and a plan of the inspection site are compared and features of the created three-dimensional model and features of the plan of the inspection site are matched.

The plan of the inspection site may, e.g., be an official map of the inspection site, in which known features are indicated, and which links at least some of the features to specific geographical or global positions. For instance, in the case that the inspection site is an underground pipe, such as a sewer pipe or a supply pipe, then the plan of the inspection site may provide information regarding exactly how the pipe runs under the ground, and where certain features of the pipe are located, relative to features above the ground. Such features of the pipe could, e.g., include bends of the pipe, branching of the pipe, connecting pipes supplying fluid to the pipe, previous repair work, etc.

Thus, features which are detected by the detection unit, and which appear from the three-dimensional model created based on the three-dimensional image(s), are matched to known features which appear from the plan of the inspection site, and thereby it is possible to accurately identify the features which are detected by means of the detection unit, including identifying their specific geographical or global positions.

Finally, a site-specific three-dimensional model of the inspection site is formed, based on the created three-dimensional model and the plan of the inspection site, and based on the comparison.

As described above, the plan of the inspection site provides information regarding positions of known features of the inspection site. Furthermore, the created three-dimensional model provides a three-dimensional view of what the perception module perceives, and thereby a true three-dimensional view of the actual inspection site. Since the comparison provides matches between known features appearing in the plan of the inspection site and perceived features of the created three-dimensional model, the created three-dimensional model is matched to the plan of the inspection site, in such a manner that the perceived features of the three-dimensional model are linked to specific positions provided by the plan of the inspection site. Accordingly, the site-specific three-dimensional model of the inspection site provides a direct link between features perceived by means of perception module and specific positions, e.g. positions arranged above the ground, such as positions on the ground, positions in a global coordinate system, etc.

Thus, in the case that the perception module detects features which require attention, e.g. in the form of maintenance or repair, the exact positions of such features can also be identified. Accordingly, in the case that the inspection site is below the ground, it is also possible to pinpoint exactly where to dig in order to directly reach the feature requiring attention. Thereby inconveniences related to the maintenance or repair can be minimised.

The detection unit may comprise at least a first camera and a second camera, the first camera having a first detection direction and a first viewing field, and the second camera having a second detection direction and a second viewing field, wherein the first detection direction and the second detection direction are fixed relative to each other, wherein the first viewing field and the second viewing field define an overlapping zone, and the step of obtaining at least one three-dimensional image may comprise the steps of:

capturing images by means of the first camera and the second camera of the detection unit, and
obtaining the three-dimensional image, based on the captured images.

According to this embodiment, the detection unit comprises at least two cameras, i.e. at least two cameras are mounted on or form part of the perception module. The first camera has a first detection direction and a first viewing field. In the present context the term 'detection direction' should be interpreted to mean a direction in which the camera is directed. In the present context the term 'viewing field' should be interpreted to mean a total area which the camera is able to 'see' simultaneously. Thus, the viewing field determines how large a portion of the surroundings the camera is able to perceive in a single image, and the detection direction determines which part of the surroundings is perceived. Similarly, the second camera has a second detection direction and a second viewing field.

Further, according to this embodiment, the first detection direction and the second detection direction are fixed relative to each other. Thus, the first camera and the second camera are mounted in such a manner that they may move along with the perception module, but they do not move relative to each other.

Further, according to this embodiment, the first viewing field and the second viewing field define an overlapping zone. Thus, there is an overlap between the part of the surroundings which is captured by means of the first camera and the part of the surroundings which is captured by means of the second camera. Accordingly, some features of the surrounding will be captured simultaneously by means of the first camera as well as by means of the second camera, within the overlapping zone. Thereby a three-dimensional image can be obtained based on the part of the images being within the overlapping zone. The first camera and the second camera may be regarded as a single stereo camera.

Thus, according to this embodiment, the step of obtaining at least one three-dimensional image is performed by capturing images by means of the first camera and the second camera of the detection unit, and obtaining the three-dimensional image, based on the captured images.

The first detection direction may be non-parallel to the second detection direction, and the step of obtaining at least one three-dimensional image may comprise the steps of:

capturing images by means of the first camera and the second camera of the detection unit,
transforming the captured images into images representing aligned detection directions of the cameras, and
obtaining the three-dimensional image, based on the transformed images.

According to this embodiment, the first detection direction and the second detection direction are non-parallel. For instance, the first detection direction and the second detection direction may diverge from each other in a direction away from the perception module. Thus, according to this embodiment, the first camera and the second camera are not aligned, i.e. the cameras are not pointed in the same direction. Instead, the cameras are pointed in different directions, forming an angle there between, e.g. in such a manner that the detection directions diverge from each other, i.e. in such a manner that the distance between the detection directions increase with the distance to the perception module.

Since the first detection direction and the second detection direction are, in this case, non-parallel, and possibly diverging, the overlap between the first viewing field and the second viewing field is not total. Accordingly, a portion of the first viewing field as well as a portion of the second viewing field does not form part of the overlapping zone. Thereby some features of the surroundings will only be captured by means of the first camera, and some features of the surroundings will only be captured by means of the second camera. Thereby the total viewing field of the first camera and the second camera is larger than the viewing fields of each of the first camera and the second camera. This allows a larger portion of the surroundings to be captured simultaneously, thereby reducing dead angles, etc.

However, since the first detection direction and the second detection direction are non-parallel, features within the overlapping zone are perceived simultaneously by the cameras in two different ways and from two different angles. Therefore, a three-dimensional image can not be readily derived from the images captured by the first and second cameras, respectively, as is normally done in traditional multi-camera stereo vision perception modules. Therefore, according to this embodiment, the images captured by means of the first camera and by means of the second camera are transformed into images representing aligned detection directions of the cameras. Since the detection directions are fixed relative to each other, the angle between the detection directions is known. Thereby it is possible to compensate for the non-alignment of the cameras by transforming the captured images into images which represent what the images would have looked like if the cameras had been aligned along parallel directions.

Finally, the three-dimensional image is obtained, based on the transformed images. The transformed images represent aligned detection directions of the cameras, i.e. the transformed images correspond to images which would have been captured by the cameras if their detection directions had been aligned along parallel directions. Accordingly, the transformed images provide a basis for obtaining a three-dimensional image, which is similar to the basis applied in traditional multi-camera stereo vision applications. Thus, the three-dimensional image can be obtained in the usual manner, once the captured images have been transformed in the manner described above.

The first detection direction and the second detection direction may form an acute angle there between, e.g. an angle which is within the interval 30°-80°, such as within the interval 50°-70°, such as within the interval 55°-65°, such as approximately 60°.

As an alternative, the first detection direction and the second detection direction may be substantially parallel, i.e. the first camera and the second camera may be substantially aligned. In this case the three-dimensional image may be obtained in a manner which is normally applied in traditional multi-camera stereo vision applications.

The detection unit may further comprise at least a third camera having a third detection direction and a third viewing field, wherein the third detection direction is fixed relative to the first detection direction and to the second detection direction, wherein the third detection direction is non-parallel to the first detection direction and to the second detection direction, wherein the third viewing field defines an overlapping zone with the first viewing field and/or with the second viewing field, and the step of obtaining a three dimensional image may be performed based on images captured by the first camera and the second camera, based on images captured by the first camera and the third camera, and/or based on images captured by the second camera and the third camera.

The third detection direction may further be diverging relative to the first detection direction and/or relative to the second detection direction.

According to this embodiment, the perception module comprises at least three cameras of the kind described above, i.e. the first camera, the second camera and the third camera. At least one of the cameras, i.e. the third camera, has a detection direction which is non-parallel to the detection direction of each of the other cameras. Furthermore, the viewing field of each of the cameras defines an overlapping zone with the viewing of at least one of the other cameras. Preferably, an overlapping zone may be defined which comprises part of the first viewing field, the second viewing field, as well as the third viewing field, although there may also be overlapping zones defined by only two of the cameras. In this case, a very accurate three-dimensional image can be obtained, based on data from the overlapping zone comprising contributions from all three cameras, because a given feature within this zone is perceived in three different manners.

Furthermore, applying at least three cameras provides a total viewing field of all three cameras which is larger than a total viewing field provided by two of the cameras.

The third detection direction may extend out of a plane spanned by or including the first detection direction and the second detection direction. According to this embodiment, the three detection directions are not arranged in a common plane. This allows detection of features arranged outside a given plane. For instance, the perception module may be capable of detecting features in a front direction, to the sides, and above and/or below the perception module.

According to one embodiment, the detection unit may comprise at least four cameras, where pairs of cameras form stereo cameras. For instance, two cameras may form a stereo camera directed substantially in a forward direction, and two other cameras may form another stereo camera directed in a substantially upwards direction. In this case the forwardly directed stereo camera may be applied for obtaining three-dimensional images of a region in front of an inspection vehicle having the perception module mounted thereon, and the upwardly directed stereo camera may be applied for obtaining three-dimensional images of a region above the inspection vehicle. The three-dimensional images of the region above the inspection vehicle are particularly suitable for obtaining a good three-dimensional model of connecting pipes merging into a main pipe from above.

The three-dimensional images obtained by the two stereo cameras may then be stitched together to form complete three-dimensional images of the surroundings of the inspection vehicle. In the case that there is an overlap between the viewing fields of the forwardly directed cameras and the viewing fields of the upwardly directed cameras, this stitching can be performed based on matching of features within the overlapping zone. In the case that there is no such overlap, the stitching may be performed based on knowledge regarding movements of the inspection vehicle, e.g. including a speed of the movement of the inspection vehicle and/or pose of the vehicle, and possibly based on recognition of features perceived by the respective cameras at different times. Knowledge regarding the movement of the inspection vehicle may, e.g., be obtained by means of odometry and/or based on visual Simultaneous Localization and Mapping (SLAM) and/or based on visual Structure from Motion (SFM).

The method may further comprise evaluating quality of the obtained three-dimensional image by performing the steps of:

determining a first contrast parameter within the overlapping zone of the image captured by means of the first camera, determining a second contrast parameter within the overlapping zone of the image captured by means of the second camera, comparing the first contrast parameter and the second contrast parameter, and evaluating quality of the obtained three-dimensional image based on the comparison.

According to this embodiment, the quality of the three-dimensional image is evaluated based on evaluations of the images captured by means of the first and second cameras, respectively, within the overlapping zone. Since features, structures, etc. within the overlapping zone are perceived by means of the first camera as well as by means of the second camera, this allows comparison of two different perceptions of such features, structures, etc.

More particularly, according to this embodiment, a first contrast parameter is determined within the overlapping zone of the image captured by means of the first camera, and a second contrast parameter is determined within the overlapping zone of the image captured by means of the second camera. In the present context the term 'contrast parameter' should be interpreted to mean a parameter which is indicative for a contrast within the captured image, i.e. differences in luminance, colour, brightness, etc., which allows features to be distinguishable within the image. For instance, the contrast parameter may include information regarding variations from one pixel to an adjacent pixel, in the case that the cameras are digital cameras. Large variance indicates sharp distinction from one pixel to another, and thereby a high contrast. Similarly, small variance indicates vague distinction from one pixel to another, and thereby a low contrast.

The first contrast parameter and the second contrast parameter are then compared, and the quality of the obtained three-dimensional image is evaluated based on the comparison. If the first contrast parameter and the second contrast parameter are similar, this indicates that the overlapping zone is perceived in similar manners by the first camera and the second camera. When this is the case, it is possible to derive a high-quality three-dimensional image, based on the images captured by means of the first and second cameras. The quality of the resulting three-dimensional image may therefore be regarded as having a high quality if the comparison reveals a high similarity between the first contrast parameter and the second contrast parameter.

On the other hand, if the first contrast parameter and the second contrast parameter differ significantly from each other, this indicates a discrepancy between how the first camera perceives the overlapping zone and how the second camera perceives the overlapping zone. This could, e.g., be due to malfunction, fouling, or the like of one of the cameras. In any event, such a discrepancy may prevent a high-quality three-dimensional image from being derived from the images captured by means of the first and second cameras. Accordingly, the resulting three-dimensional image may be regarded as having low quality if the comparison reveals a discrepancy between the first contrast parameter and the second contrast parameter.

As an alternative, the method may further comprise evaluating quality of the obtained three-dimensional image by performing the steps of:

capturing a first image and a second image by means of one of the cameras, the first image being captured at a first point in time and the second image being captured at a second point in time, where a time difference is defined between the first point in time and the second point in time, identifying at least one feature present in the first image and in the second image, comparing a first position of the identified feature within the first image and a second position of the identified feature within the second image to an expected movement of the identified feature from the first point in time to the second point in time, and evaluating quality of the obtained three-dimensional image based on the comparison.

According to this embodiment, the quality of the three-dimensional image is not evaluated based on comparison between images obtained substantially simultaneously by means of two different cameras, but rather based on comparison between images obtained at different points in time, using the same camera.

Thus, according to this embodiment, a first image and a second image are captured by means of one of the cameras. The first image is captured at a first point in time, and the second image is captured at a second, later, point in time, i.e. a time difference is defined between the first point in time, where the first image is captured, and the second point in time, where the second image is captured. In the case that the perception module is mounted on or forms part of a moving vehicle, the perception module, and thereby the cameras, will have moved relative to the surroundings between the capture of the first image and the capture of the second image. Similarly, if objects being captured by means of the cameras are moving, this will also represent such a relative movement between the capture of the images.

Next, at least one feature present in the first image and in the second image is identified. As described above, if relative movement between the perception module and at least part of the surroundings is taking place, then it may be expected that the identified feature has moved in a specific manner, corresponding to the relative movement, within the viewing field of the camera, from the first image to the second image.

Accordingly, a first position of the identified feature within the first image and a second position of the identified feature within the second image are compared to an expected movement of the identified feature from the first point in time to the second point in time, and the quality of the obtained three-dimensional image is evaluated based on the comparison. As described above, if the identified feature is a real feature, and relative movement is expected, then the feature is also expected to perform a specific movement within the viewing field of the camera, i.e. it is expected that the second position is shifted relative to the first position, in a specific manner which represents the relative movement.

On the other hand, if relative movement is expected, but the second position coincides with the first position, this may be an indication that the identified feature is in fact not a real feature of the surroundings of the perception module, but rather a feature which degrades the quality of the captured images, e.g. in the form of fouling of the camera.

Thus, according to this embodiment, the evaluation of the quality of the three-dimensional image is also based on two different perceptions of the same area, but the two perceptions are obtained by the same camera, but shifted in time, rather than being obtained by two cameras simultaneously.

Thus, the method may further comprise the step of evaluating quality of the obtained three-dimensional image. Thereby it is evaluated whether or not the obtained three-dimensional image has a sufficient quality to ensure proper inspection. For instance, in the case that the evaluation of quality reveals that the quality of the obtained three-dimensional image is too low, new images may be captured immediately. Thereby it may be avoided that an inspection site needs to be revisited in order to obtain images of a proper quality.

The quality could, e.g., be evaluated in the manner described above. Alternatively, the evaluation of the quality of the obtained three-dimensional image may be performed in another manner. For instance, in the case that the detection unit comprises a three-dimensional laser scanner, e.g. directed in a forwards direction, and at least one camera, e.g. directed in an upwards direction, the quality of the obtained three-dimensional image may be evaluated by evaluating stitching between the images obtained by means of the three-dimensional laser scanner and the images obtained by means of the camera(s). If a good stitching is obtained, this is an indication that the models match, and the images obtained by means of the camera(s) merely increase the resolution, and therefore the quality of the obtained three-dimensional image is high. If not, then the quality of the obtained three-dimensional image is low.

As another alternative, the quality of the obtained three-dimensional image be evaluated by means of structure from motion (SFM), e.g. including analysis of angles between a detection direction and the position of a detected object, during movement of the detection unit. In this case the quality of the three-dimensional image may be evaluated by analysing reprojection residuals in the image. Alternatively, the three-dimensional image may be obtained from a plurality of images captured sequentially by at least one camera. In this case the quality of the three-dimensional image may be evaluated by performing triangulation and applying an optimization algorithm with respect to at least one detected feature. A variance of the output of the optimization algorithm may then provide a measure for the quality of the three-dimensional image, where a low variance indicates good quality, and a high variance indicates a poor quality.

As an alternative to obtaining the three-dimensional image by means of at least two cameras, the three-dimensional image may be obtained in another manner, e.g. by means of a laser scanner. This will be described in further detail below.

The detection unit may comprise at least one camera, and the step of obtaining at least one three-dimensional image may comprise the steps of:

capturing at least two images by means of the camera, at points in time with a time difference defined between the points in time, and obtaining the three-dimensional image, based on the captured at least two images.

According to this embodiment, the three-dimensional image may be obtained using a single camera, and by applying a structure-from-motion (SFM) technique. For instance, images may be captured by means of the camera, at different points in time. In the case that the perception module is mounted on or forms part of a moving vehicle, such as an inspection vehicle, the perception module, and thereby the camera, moves relative to the surroundings from the capture of one image to the capture of the next image. This also represents two ways of viewing the same features of the surroundings, and thereby a three-dimensional image of the surroundings can be created from a series of images captured by means of a single camera in this manner.

The method may further comprise the step of taking a pose of the perception module into account when creating the three-dimensional image. For instance, in the case that the perception module is mounted on or forms part of an inspection vehicle which moves along an uneven surface, passes over a small obstacle, has something stuck on a wheel, etc., the inspection vehicle, and thereby the perception module, will tilt, thereby changing the pose of the perception module. Such a tilt may be detected by means of the detection unit, e.g. by means of one or more forwardly directed cameras. Once detected, the pose of the perception module can be taken into account, e.g. by compensating the detected tilt. This could, e.g., be done in a manner which is similar to the transformation of images from non-aligned cameras described above, or by applying other triangulation-based approaches.

The detection unit may comprise a three-dimensional laser scanner, and the step of obtaining a three-dimensional image may be performed at least partly by means of the three-dimensional laser scanner. The three-dimensional laser scanner may be applied as an alternative to the at least two cameras described above, in which case the three-dimensional image may be obtained solely based on detections performed by means of three-dimensional laser scanner. As an alternative, the detection unit may comprise at least one camera, e.g. at least two cameras as described above, as well as a three-dimensional laser scanner. In this case the three-dimensional image may be obtained based on a combination of data from the camera(s) and data from the three-dimensional laser scanner. In this case, the data obtained from the camera(s) and the data obtained from the three-dimensional laser scanner represent two different ways of perceiving the surroundings of the perception module, similar to two images obtained by means of two cameras. For instance, data obtained from camera(s) and data obtained from the three-dimensional laser scanner may be compared in order to create the three-dimensional model of the surroundings of the perception module, and/or in order to evaluate the quality of the obtained three-dimensional image. Furthermore, data from the camera(s) may provide colour and/or texture to a laser-based three-dimensional model. Alternatively or additionally, a SLAM or SFM output may provide valuable measurement of vehicle motion, in the case that the detection unit is mounted on a vehicle, which is not available from lidar or similar detection means, e.g. in a long, straight, featureless pipe.

The step of creating a three-dimensional model of surroundings of the perception module may comprise creating a three-dimensional point cloud. In the present context the term 'three-dimensional point cloud' should be interpreted to mean a set of points in a three-dimensional space. The points could, e.g., form a mesh on surfaces of an inspection site, such as inner walls of a pipe being inspected. The three-dimensional point cloud may, e.g., be converted into a surface model, such as a triangulated mesh. Data obtained from one or more cameras may be used for colourizing the surface model.

The method may further comprise the step of evaluating quality of the created three-dimensional model, based on the comparison between the created three-dimensional model and the plan of the inspection site.

Since the plan of the inspection site represents a known layout and features of the inspection site, at least some of the known features should be recognised in the three-dimensional model. The more accurate the fit between features of the three-dimensional model and features of the plan of the inspection site, the higher the quality of the three-dimensional model may be assumed to be.

The method may further comprise the step of storing data obtained by means of the detection unit, and/or the obtained three-dimensional image and/or the created three-dimensional model in a storage device at the perception module. According to this embodiment, the data obtained by means of the detection unit, the three-dimensional image and/or the three-dimensional model is/are stored locally at the perception module, at least temporarily. Thereby it is not necessary to continuously transfer data, such as data obtained by means of the detection unit, e.g. while an inspection is conducted using the perception module. Thereby a high-capacity communication channel is not required, and the collected data may be transferred after completion of the task being performed by means of the perception module, e.g. via a wired or wireless connection.

The perception module may further comprise a processing unit, in which case the step of creating a three-dimensional model, the step of comparing the created three-dimensional model and a plan of the inspection site and/or the step of forming a site-specific three-dimensional model may be at least partly performed locally, at the perception module.

The step of comparing the created three-dimensional model and a plan of the inspection site may comprise identifying at least one feature in the three-dimensional model and matching the identified feature and a known feature in the plan of the inspection site.

According to this embodiment, features which are perceived by the detection unit are matched to known features of the plan of the inspection site, thereby allowing perceived features to be identified and linked to global positions. The perceived features may thereby be recognised and annotated.

The method may further comprise the step of detecting at least one mismatch between the created three-dimensional model and the plan of the inspection site. Such a mismatch may be in the form of a feature which appears from the created three-dimensional model, but which does not appear from the plan of the inspection site. Such a feature could, e.g., be something which requires maintenance or repair, for instance a crack, a hole or a blockage in a pipe. Alternatively, a mismatch could represent a change which has been performed to the inspection site, but which has not been added to the plan of the inspection site. Such a change could, e.g., be a new connection pipe or a former connection pipe which has been blinded.

The method may further comprise the step of forwarding information regarding the detected mismatch to an operator. In the case that the mismatch represents something which requires maintenance or repair, the operator may initiate maintenance or repair, based on the reported mismatch. In the case that the mismatch represents a change which has been performed to the inspection site, but which does not appear from the plan of the inspection site, the reported mismatch may be used for updating the plan of the inspection site to include the change.

The step of forming a site-specific three-dimensional model of the inspection site may comprise superimposing features of the three-dimensional model on matching features of the plan of the inspection site. According to this embodiment, a hybrid model is created, comprising the known features from the plan of the inspection site, overlaid with the perceived features from the created three-dimensional model.

The method may further comprise the step of performing inspection of the inspection site, based on the site-specific three-dimensional model of the inspection site.

BRIEF DESCRIPTION OF THE DRAWINGS

The invention will now be described in further detail with reference to the accompanying drawings in which.

DETAILED DESCRIPTION OF THE DRAWINGS

Figure 1:
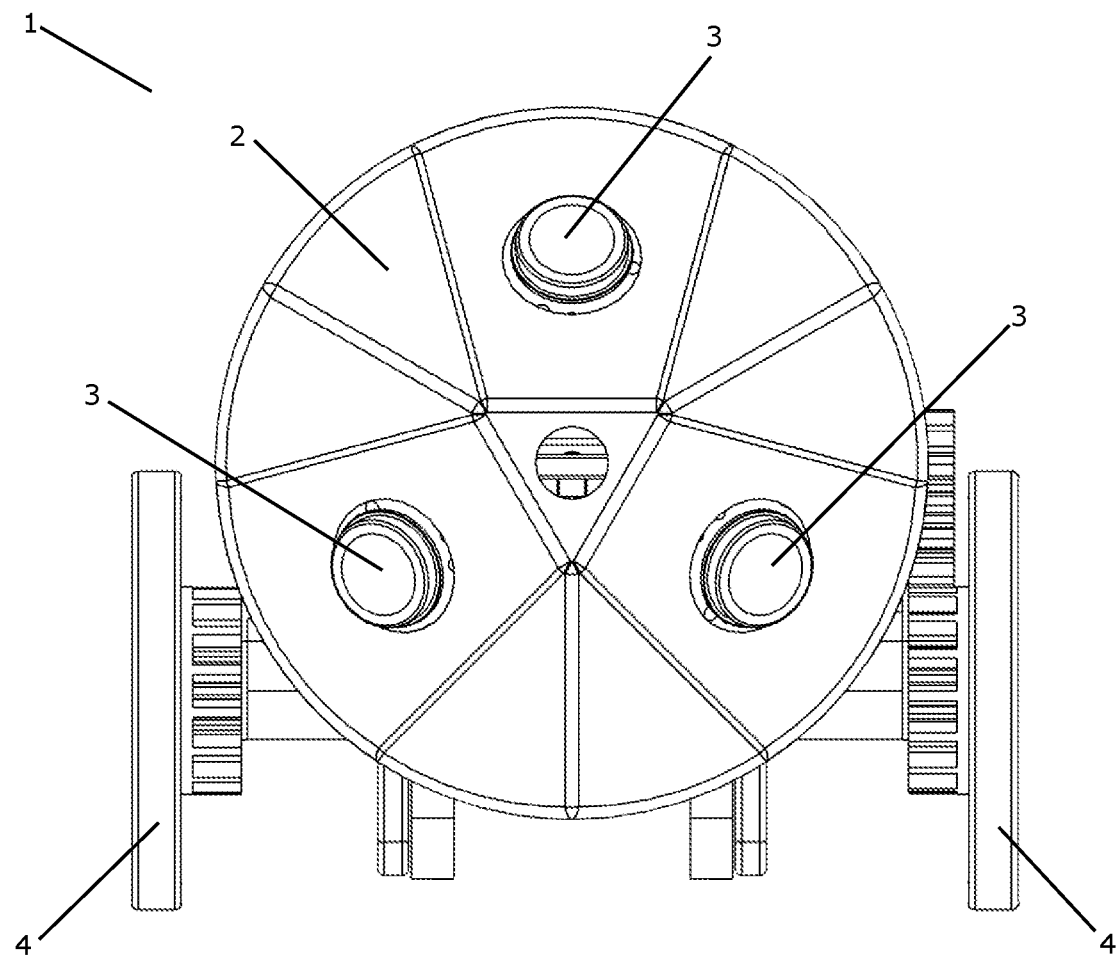
FIGS. 1-3 show an inspection vehicle, from various angles, for use in performing a method according to an embodiment of the invention.
Figure 2:
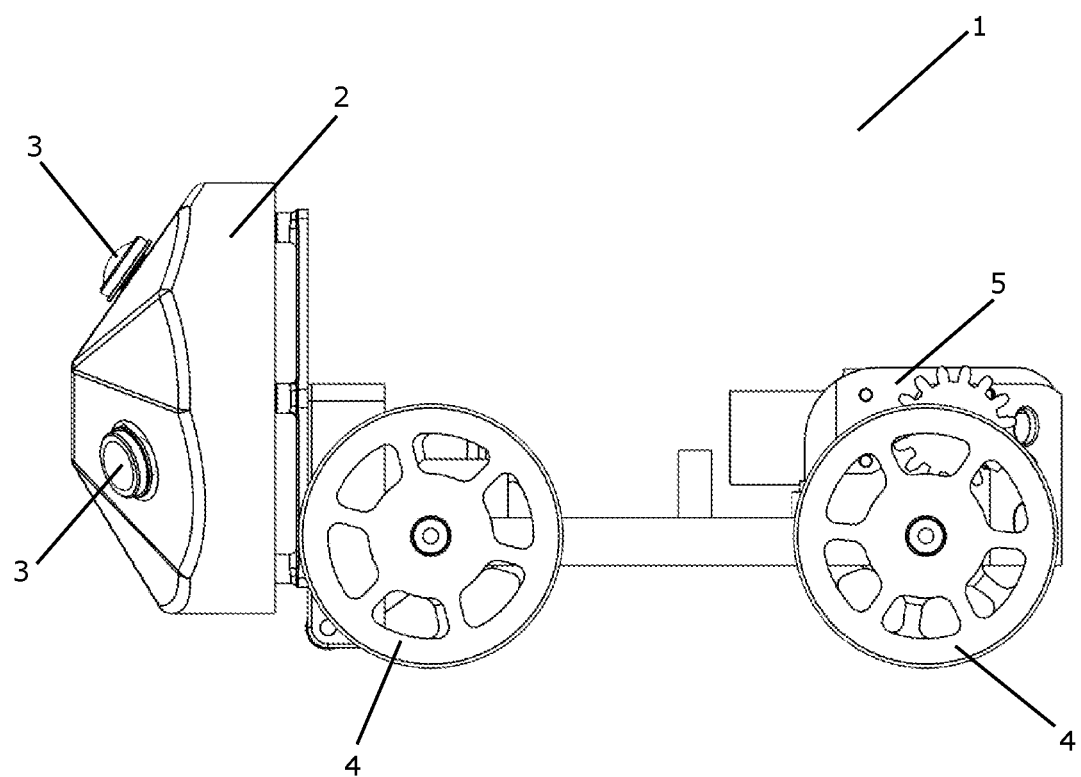
Figure 3:
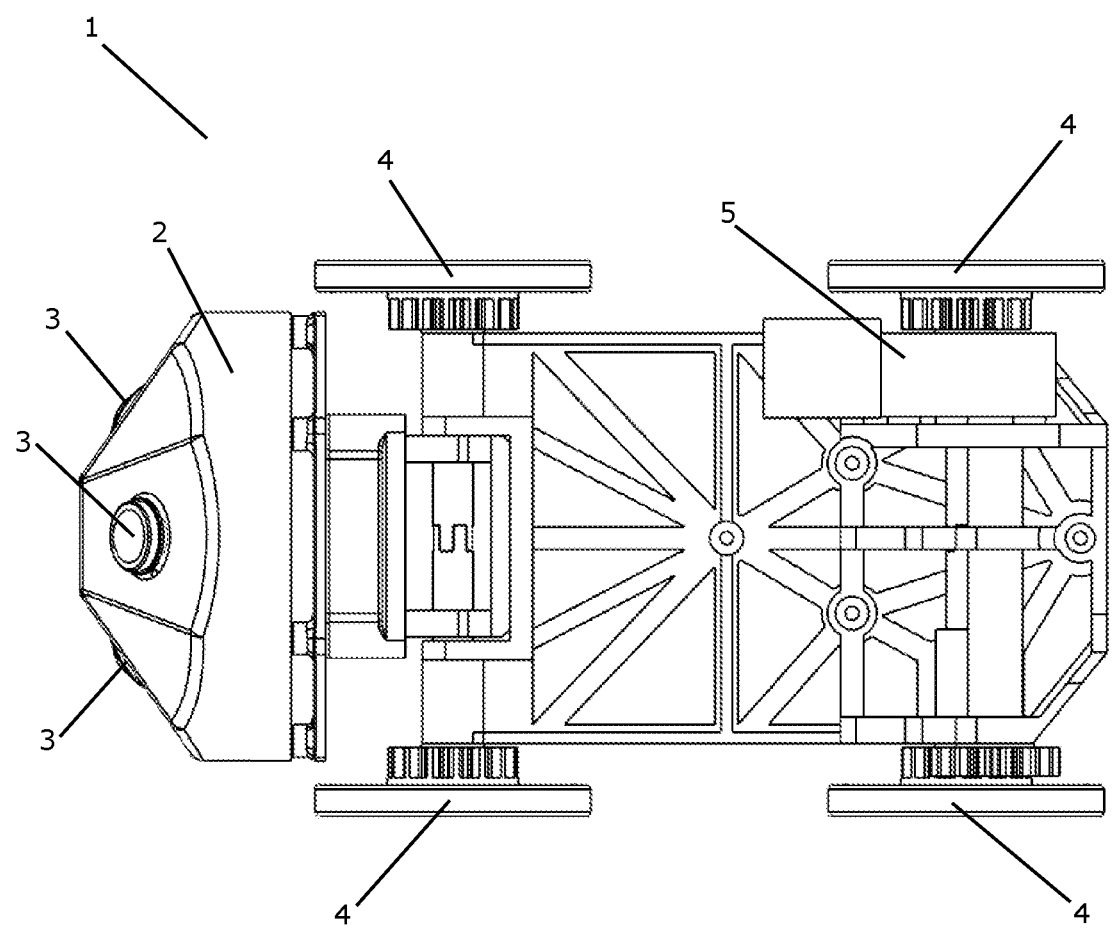

FIGS. 1-3 show an inspection vehicle 1 for use in performing a method according to an embodiment of the invention. FIG. 1 is a front view of the inspection vehicle 1, FIG. 2 is a side view of the inspection vehicle 1, and FIG. 3 is a top view of the inspection vehicle 1.

The inspection vehicle 1 comprises a perception module 2 with three cameras 3, four wheels 4, and a drive mechanism 5 for driving the wheels 4, thereby moving the inspection vehicle 1. Accordingly, by appropriately controlling the drive mechanism 5, the inspection vehicle 1 can be moved in a desired manner in order to perform inspection by means of the perception module 2.

Each of the cameras 3 of the perception module 2 defines a detection direction and a viewing field. Since the cameras are fixedly connected to the perception module 2, the detection directions of the cameras are fixed relative to each other.

The cameras 3 are positioned in such a manner that their detection directions are non-parallel, i.e. each detection direction is non-parallel to each of the other two detection directions. The detection directions are further diverging relative to each other in a direction away from the perception module 2. Furthermore, the viewing fields of the cameras 3 define pairwise overlapping zones, as well as a common overlapping zone defined by the viewing fields of all three cameras 3. Thus, none of the cameras 3 are pointed in the same direction, but rather point outwardly with respect to each other, but there are overlaps in the images captured by means of the cameras 3. This will be described in further detail below with reference to FIGS. 4-6.

Figure 4:
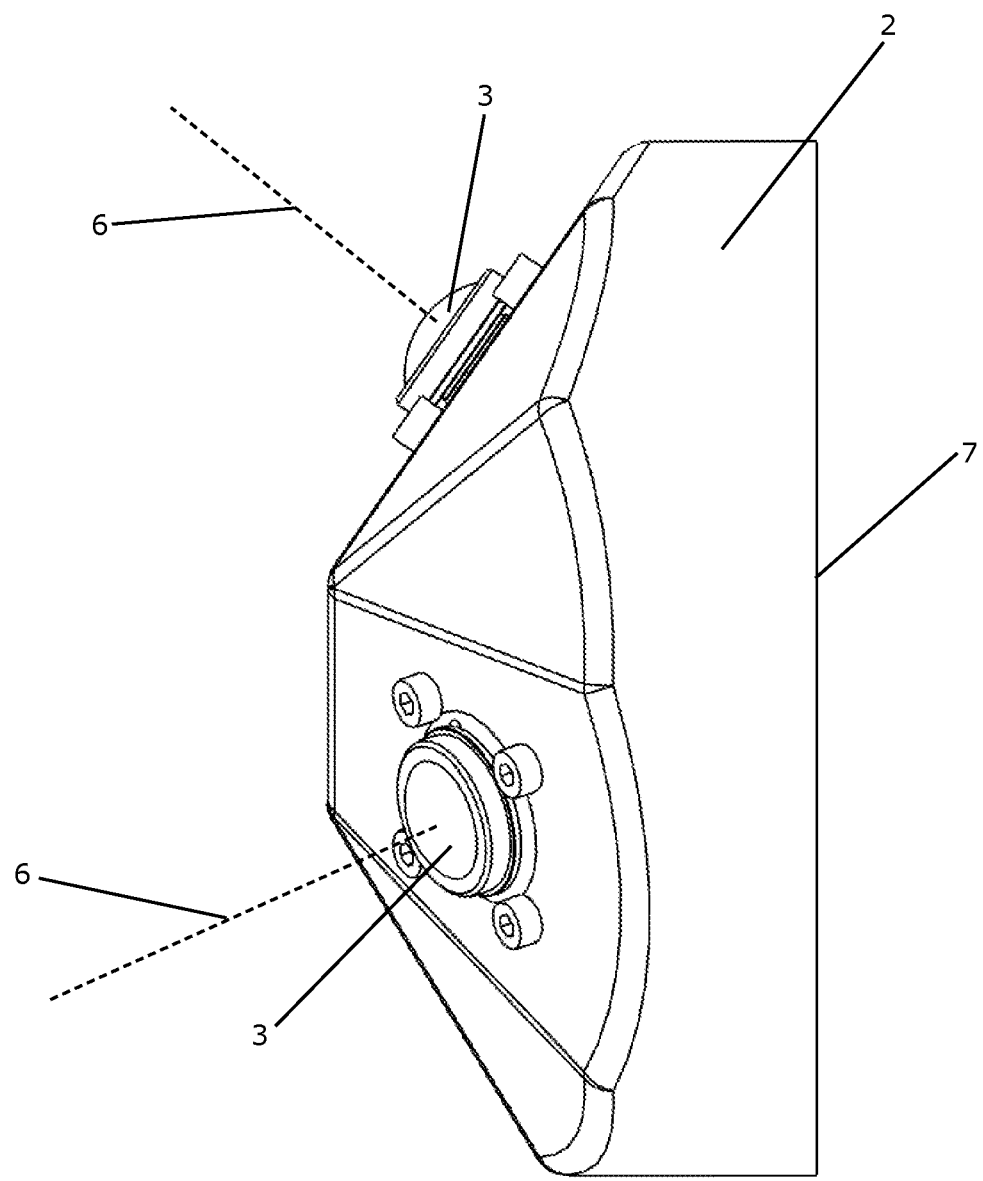
FIGS. 4-6 show a perception module, from various angles, for use in performing a method according to an embodiment of the invention.
Figure 5:
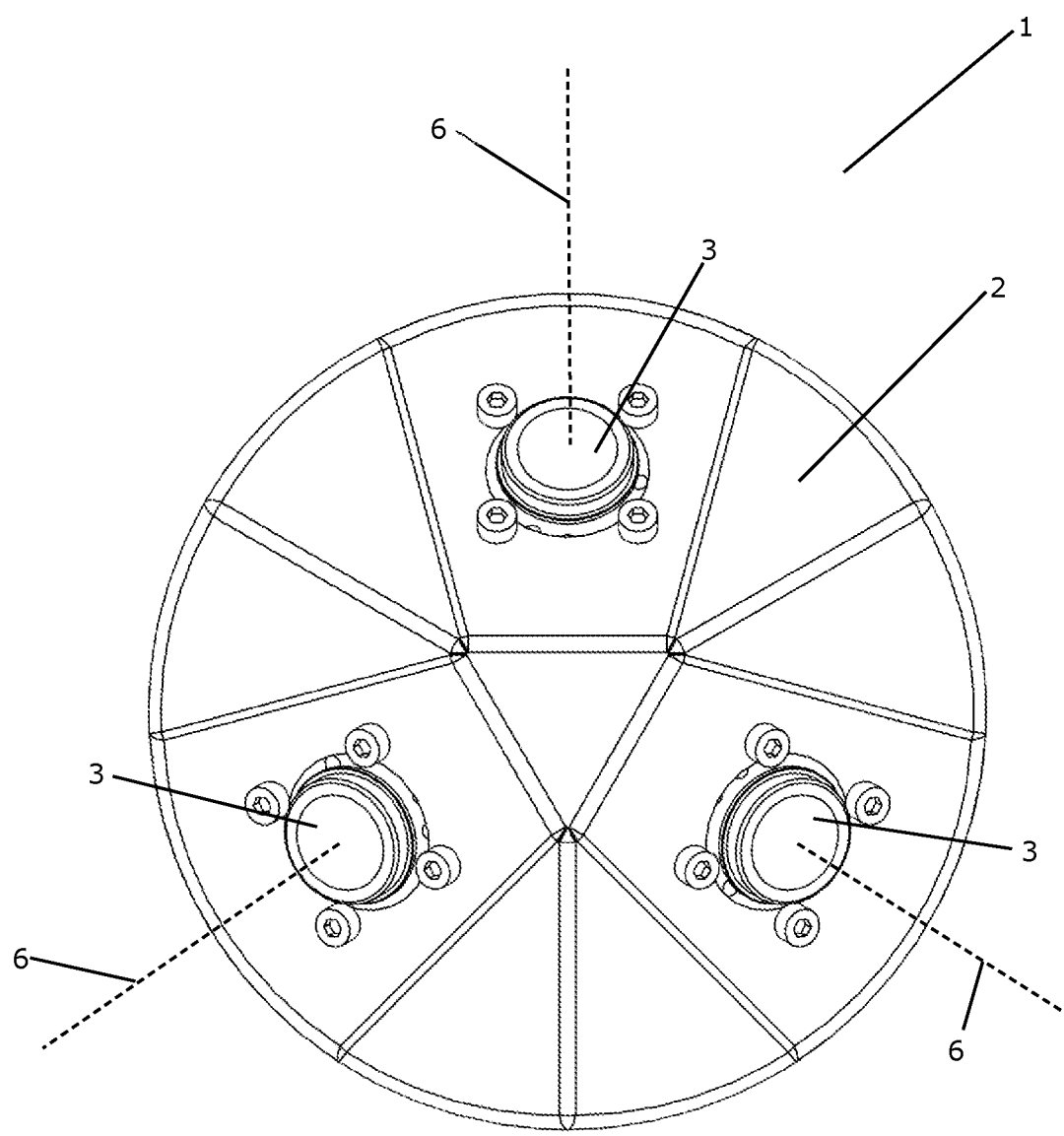
Figure 6:
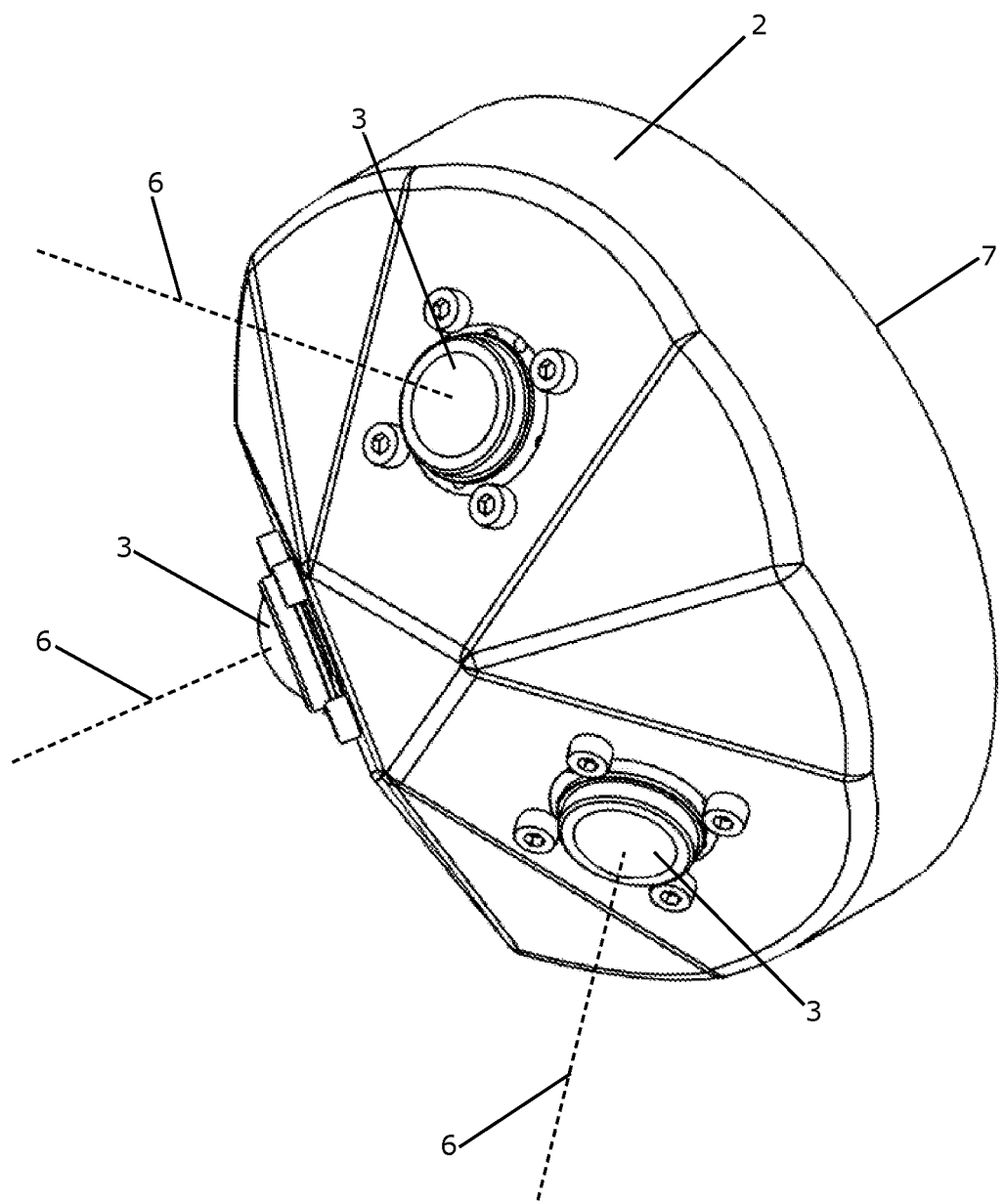

FIGS. 4-6 show a perception module 2 for use in performing a method according to an embodiment of the invention, the perception module 2 being identical to the perception module 2 shown in FIGS. 1-3, i.e. the perception module 2 comprises three cameras 3 positioned relative to each other in the manner described above with reference to FIGS. 1-3. FIG. 4 is a side view of the perception module 2, FIG. 5 is a front view of the perception module 2, and FIG. 6 is a perspective view of the perception module 2.

The detection directions of the respective cameras 3 are illustrated by dashed lines 6. It can be seen that the detection directions 6 are non-parallel. Instead, each of the detection directions 6 forms a diverging angle of approximately 60° with respect to each of the other detection directions 6.

From FIG. 5 it can be seen that the cameras 3 are evenly distributed along a circle encircling a centre axis of the perception module 2. Furthermore, the detection directions 6 each forms an angle of approximately 35° with respect to a rear surface 7 of the perception module 2.

Since the cameras 3 are positioned in the manner described above, it is possible for the cameras 3 to cover a large area, while allowing for accurate three-dimensional images to be obtained, based on the part of the captured images which is within the overlapping zones of the viewing fields of the cameras 3.

Figure 7:
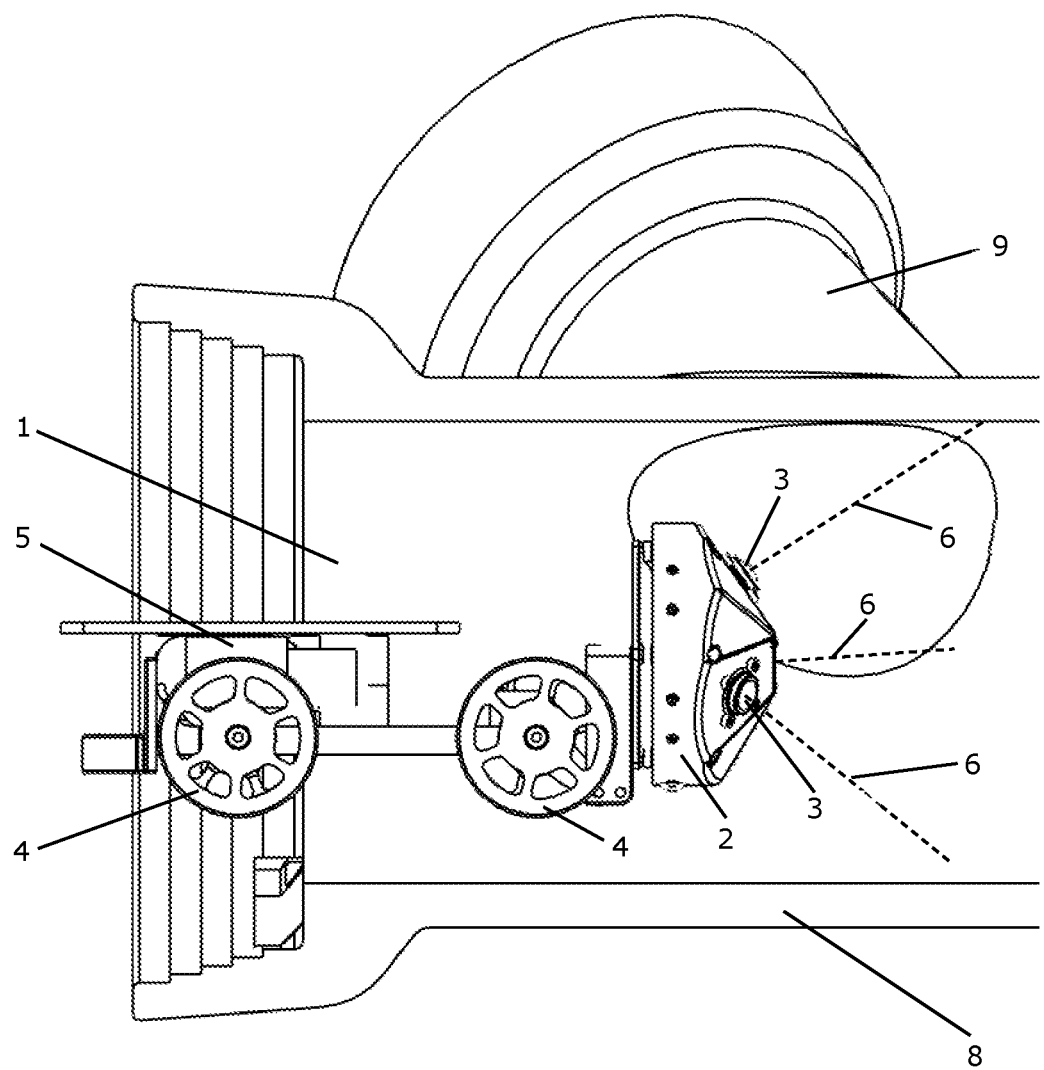
FIGS. 7 and 8 illustrate the inspection vehicle of FIGS. 1-3 inside a pipe.
Figure 8:
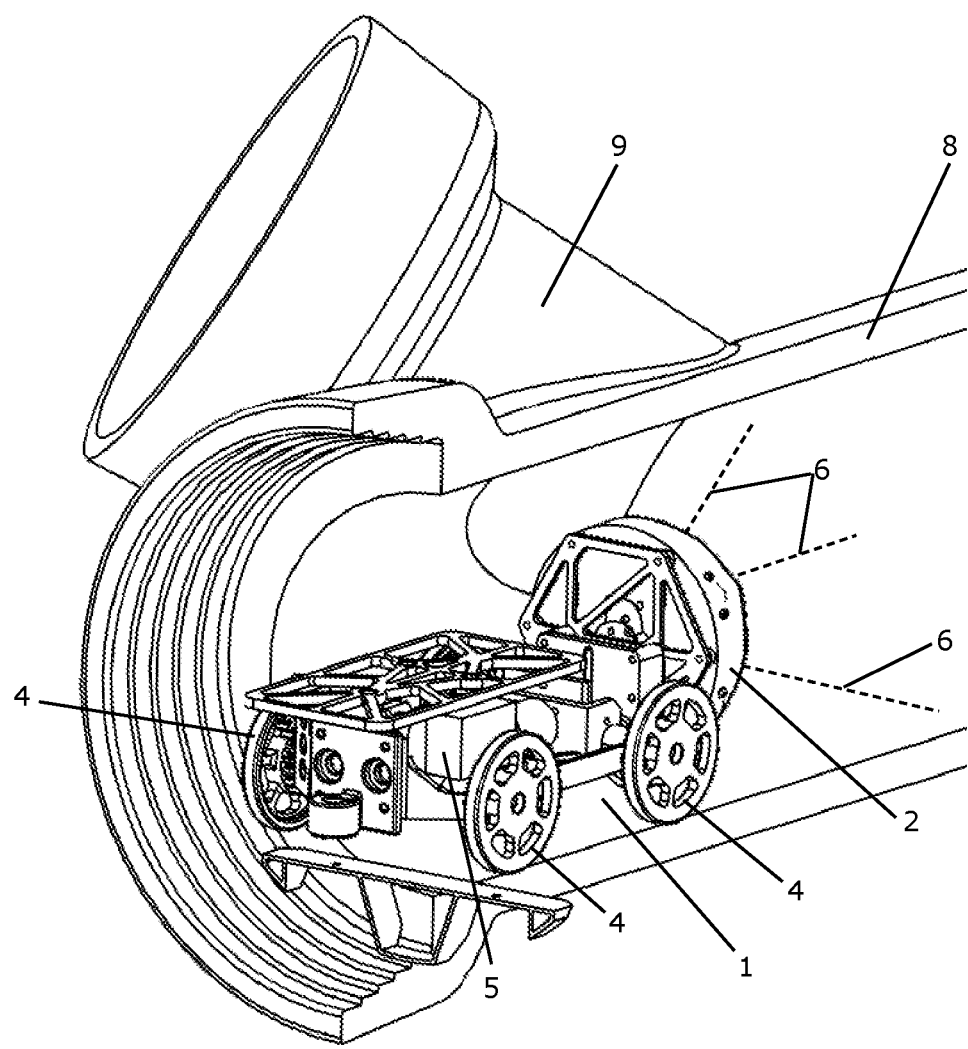

FIGS. 7 and 8 illustrate the inspection vehicle 1 of FIGS. 1-3 inside a pipe 8. The pipe 8 could, e.g., be an underground pipe, e.g. a sewer pipe or a supply pipe, such as a water pipe or a district heating pipe. A connecting pipe 9 is attached to the pipe 8 at an upper portion of the pipe 8, thereby allowing fluids flowing in the connecting pipe 9 to enter the pipe 8 due to gravity.

The relative positions of the cameras 3 of the perception module 2 ensures that the detection direction 6 of one of the cameras 3 is angled in an upwards direction. This allows the connecting pipe 9 to be perceived by the cameras 3, even when the inspection vehicle 1 is arranged directly beneath the connecting pipe 9. Accordingly, it is also possible to perceive details from the interior of the connecting pipe 9 by means of the cameras 3.

The inspection vehicle 1 is capable of moving along the pipe 8, in the interior part thereof, by appropriately controlling the drive mechanism 5, thereby causing rotation of the wheels 4 and corresponding movement of the inspection vehicle 1. Accordingly, the interior part of the pipe 8 can be inspected, using the cameras 3 of the perception module 2, while the inspection vehicle 1 moves along the pipe 8.

The overlapping zones of the viewing fields of the cameras 3 are primarily arranged in a direction in front of the inspection vehicle 1. Accordingly, high quality three-dimensional images can be obtained of the part of the pipe 8 arranged in front of the inspection vehicle 1, while at the same time obtaining images of more peripheral parts of the pipe 8, such as the position where the connecting pipe 9 is attached to the pipe 8.

Figure 9:
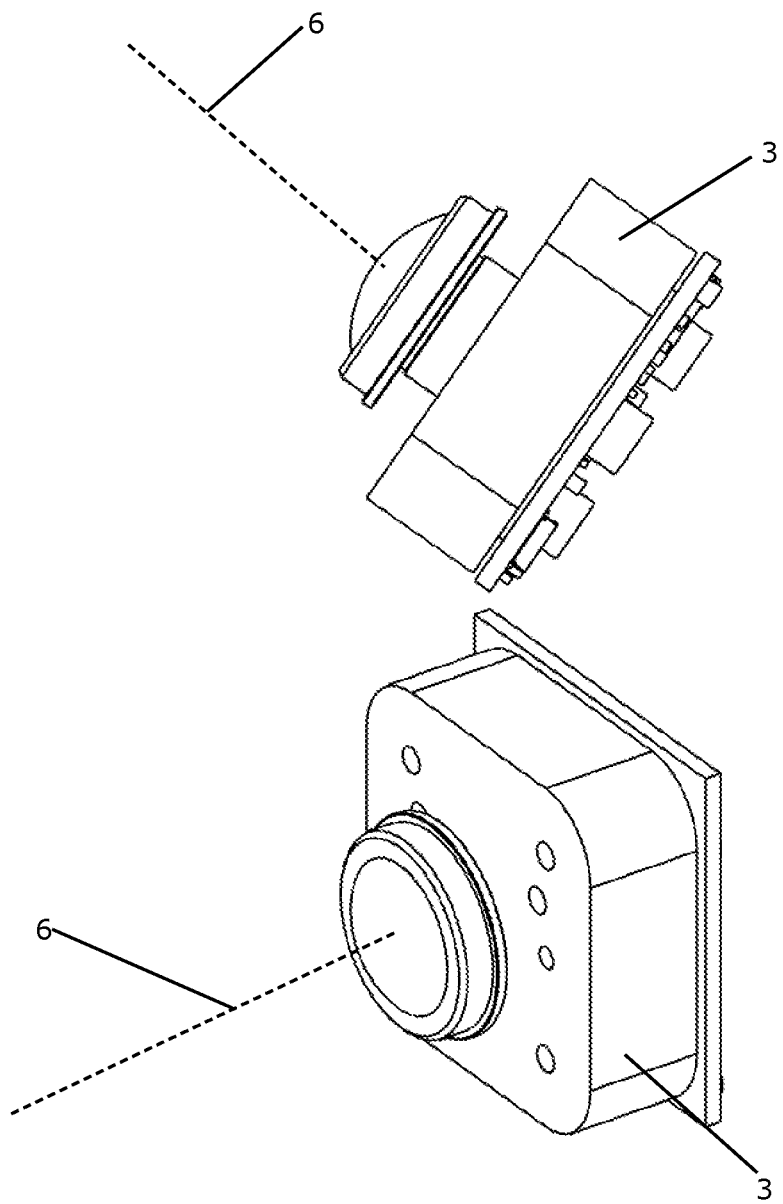
FIGS. 9-11 show cameras for an alternative perception module for use in performing a method according to an embodiment of the invention.
Figure 10:
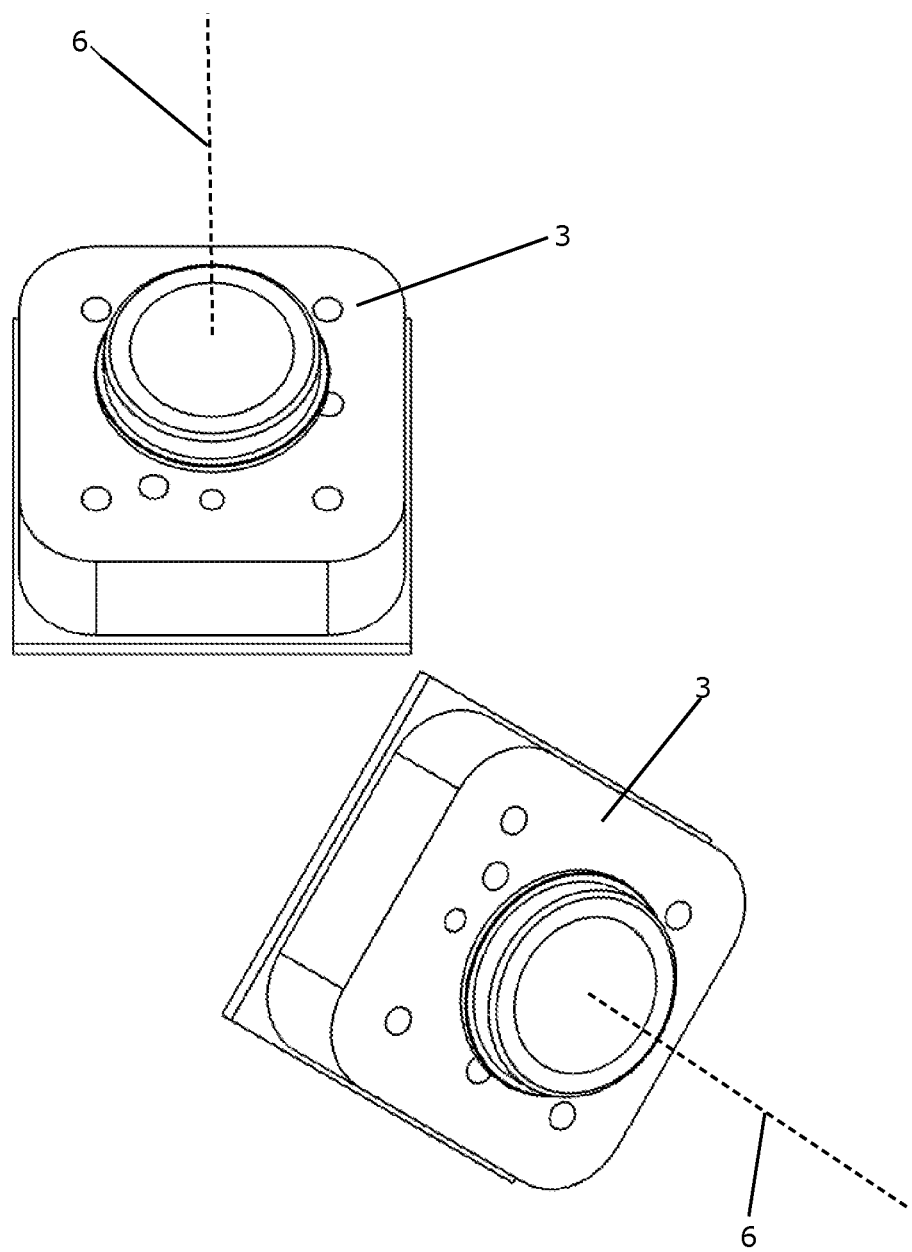
Figure 11:
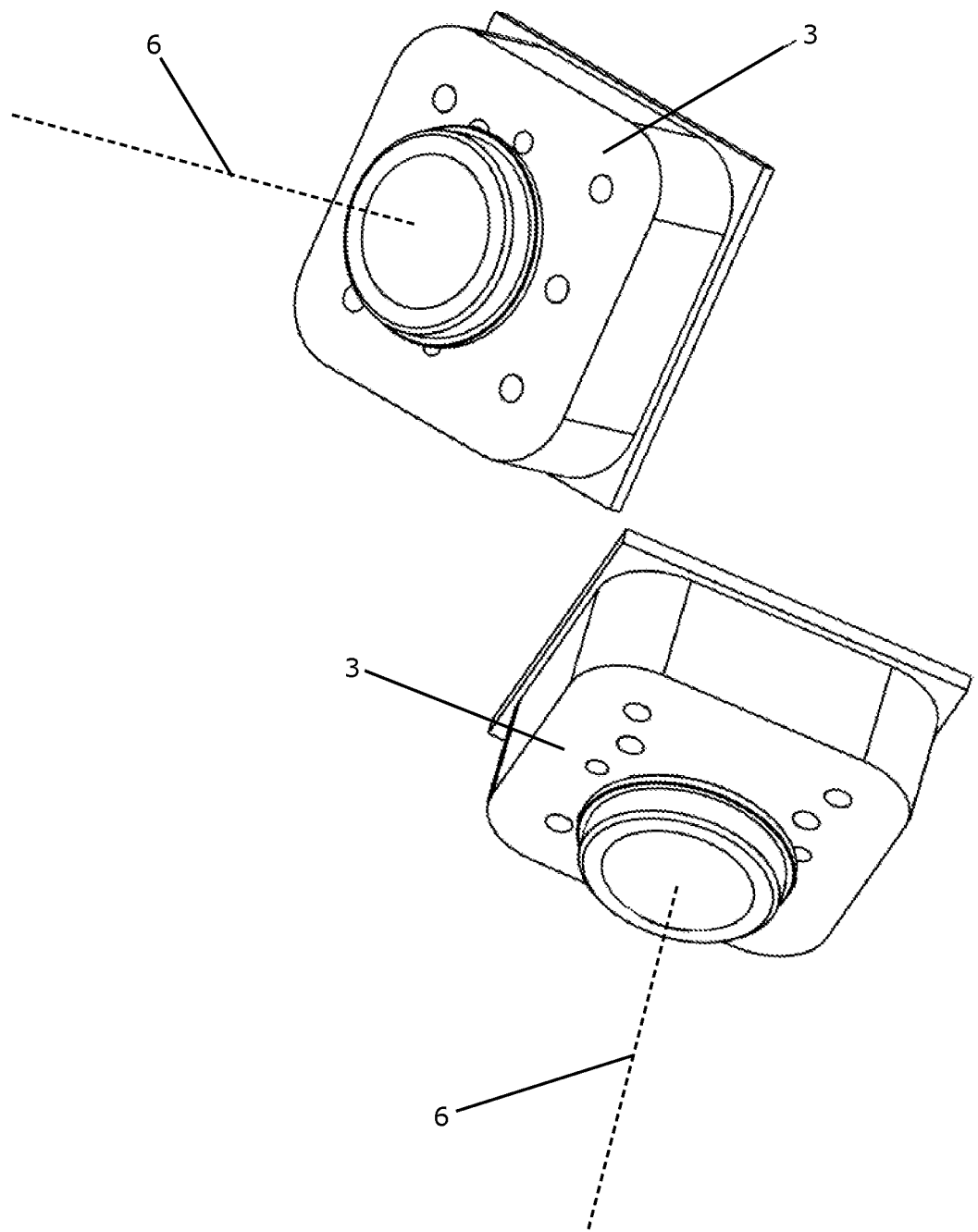

FIGS. 9-11 show cameras 3 of an alternative perception module, shown from three different angles, for use in performing a method according to an embodiment of the invention. The perception module according to this embodiment comprises only two cameras 3 with non-parallel detection directions 6. However, the remarks set forth above with reference to FIGS. 1-6 are equally applicable here.

FIGS. 12-17 are schematic views of various alternative inspection vehicles 1 for use in performing a method according to an embodiment of the invention. Each Figure shows the respective inspection vehicle 1 in a top view, a side view and a front view.

Figure 12:
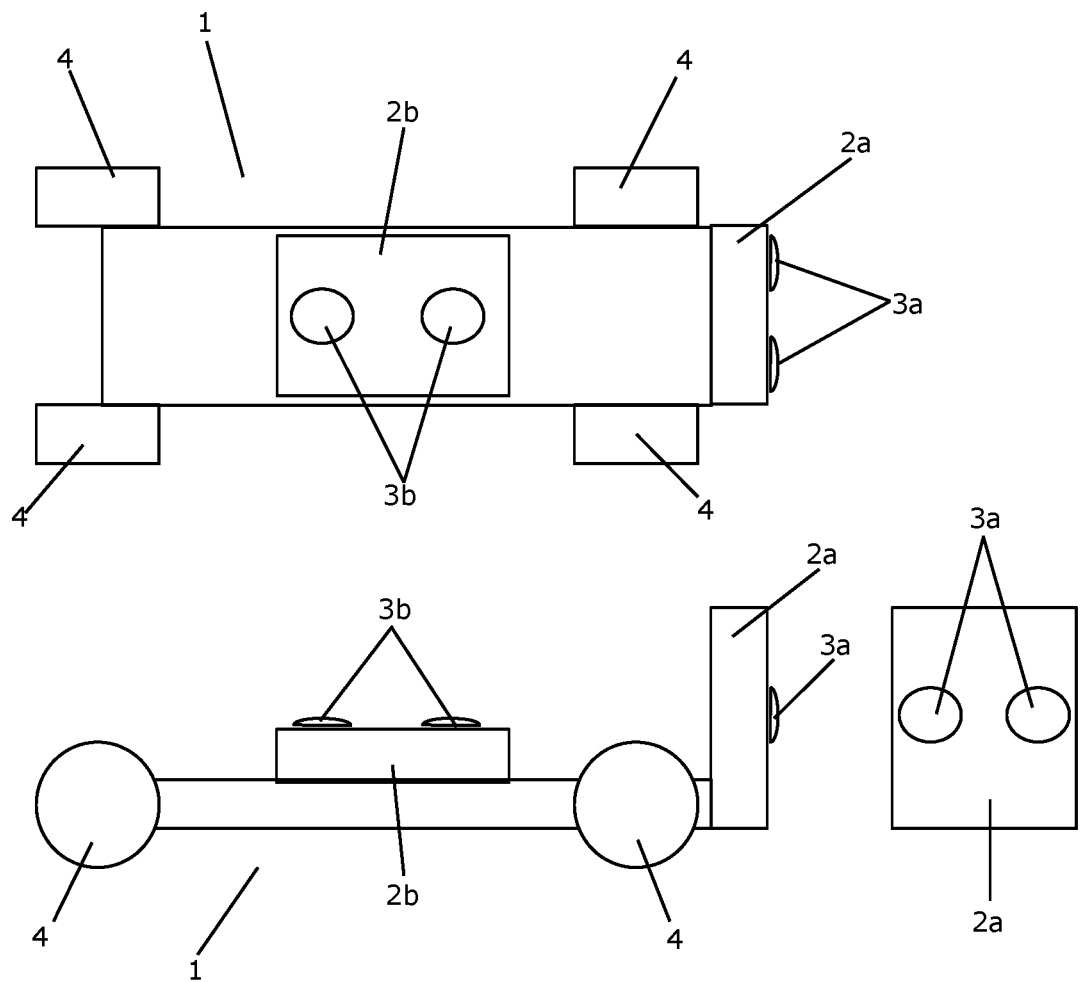
FIGS. 12-17 illustrate various alternative inspection vehicles for use in performing a method according to an embodiment of the invention.

The inspection vehicle 1 of FIG. 12 comprises four wheels 4 and a perception module in the form of a first perception module part 2a and a second perception module part 2b. The first perception module part 2a comprises two cameras 3a directed in a forward direction, i.e. in a direction in which the inspection vehicle 1 normally moves during inspection. Furthermore, the cameras 3a of the first perception module part 2a are aligned, in the sense that they define detection directions which are substantially parallel to each other. Accordingly, the cameras 3a of the first perception module part 2a form a first traditional stereo camera, and three-dimensional images of the region in front of the inspection vehicle 1 can thereby be obtained in a normal manner by means of the cameras 3a of the first perception module part 2a.

The second perception module part 2b also comprises two cameras 3b. The cameras 3b of the second perception module part 2b are directed in an upwards direction, and thereby substantially perpendicularly to the cameras 3a of the first perception module part 2a. The cameras 3b of the second perception module part 2b are also aligned, i.e. their detection directions are substantially parallel to each other. Accordingly, the cameras 3b of the second perception module part 2b form a second traditional stereo camera, and three-dimensional images of the region above the inspection vehicle 1 can thereby be obtained in a normal manner by means of the cameras 3b of the second perception module part 2b.

Accordingly, the perception module 2a, 2b is capable of simultaneously obtaining three-dimensional images of the region in front of the inspection vehicle 1 and the region above the inspection vehicle 1. The three-dimensional images obtained by means of the cameras 3a of the first perception module part 2a and the three-dimensional images obtained by means of the cameras 3b of the second perception module part 2b may be stitched together in order to obtain a more complete three-dimensional image of the surroundings of the inspection vehicle 1. Based on the resulting three-dimensional image, a three-dimensional model of the surroundings of the inspection vehicle 1 is created.

Since the resulting three-dimensional image of the surroundings of the inspection vehicle 1 includes a part which covers the region immediately above the inspection vehicle 1, it is, e.g., possible to obtain an accurate three-dimensional model of the region above the inspection vehicle, for instance including an accurate three-dimensional model of a connecting pipe entering a main pipe in which the inspection vehicle 1 is moving.

Figure 13:
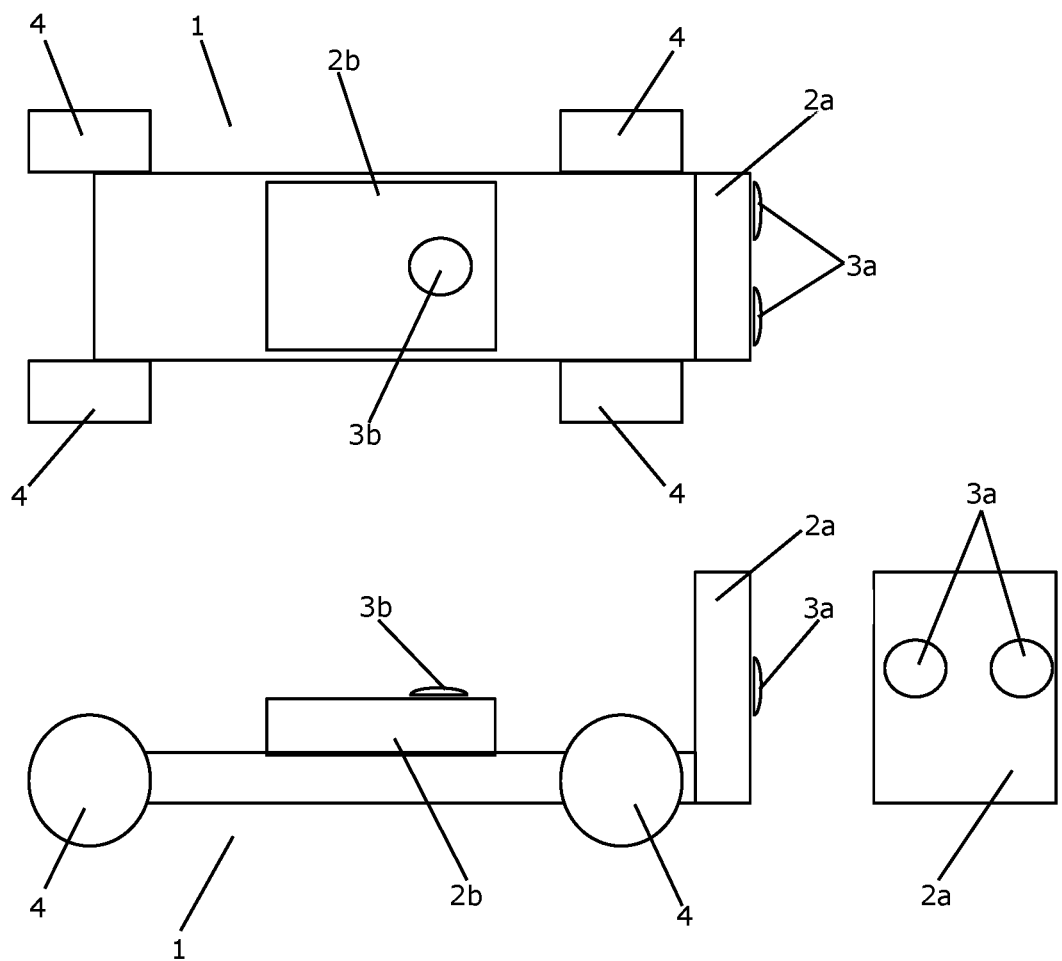

The inspection vehicle 1 of FIG. 13 is very similar to the inspection vehicle of FIG. 12, and it will therefore not be described in detail here. However, in the inspection vehicle 1 of FIG. 13, the second perception module part 2b comprises only one camera 3b. Therefore, in this case a three-dimensional image of the surroundings of the inspection vehicle 1 is obtained based on information captured by the two cameras 3a of the first perception module part 2a, combined with information captured by the camera 3b of the second perception module part 2b. Similarly to the embodiment described above with reference to FIG. 12, the camera 3b of the second perception module part 2b provides detailed images of features arranged directly above the inspection vehicle 1, and thereby it is ensured that such features are appropriately represented in the three-dimensional model of the surroundings which is created based on the three-dimensional image, although the images obtained by means of the camera 3b of the second perception module part 2b are not per se three-dimensional images. Accordingly, the inspection vehicle 1 of FIG. 13 may be regarded as a low-cost version of the inspection vehicle 1 of FIG. 12.

Figure 14:
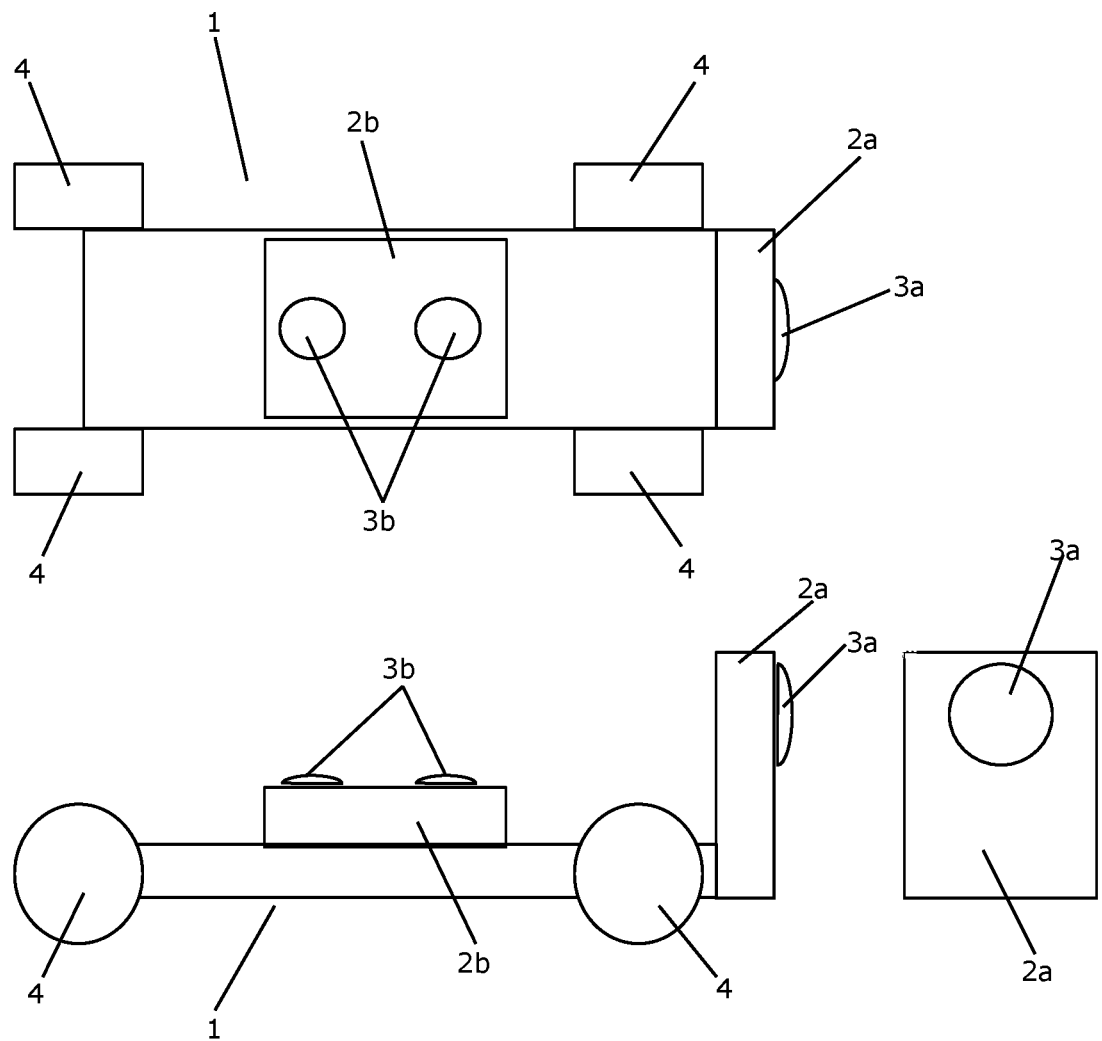

The inspection vehicle 1 of FIG. 14 is very similar to the inspection vehicle 1 of FIG. 12, and it will therefore not be described in detail here. However, in the inspection vehicle 1 of FIG. 14, the first perception module part 2a comprises only one camera 3a. According to this embodiment, three-dimensional images of the region above the inspection vehicle 1 are obtained directly by means of the two cameras 3b of the second perception module part 2b, in the manner described above with reference to FIG. 12.

Furthermore, three-dimensional images of the region in front of the inspection vehicle 1 are obtained by means of the camera 3a of the first perception module part 2a, as the inspection vehicle 1 moves forward. This could, e.g., be done by means of a structure-from-motion (SFM) technique, in which a three-dimensional images is derived from a time series of images, combined with knowledge regarding the movement of the inspection vehicle 1, e.g. including knowledge regarding the speed of the movement.

Figure 15:
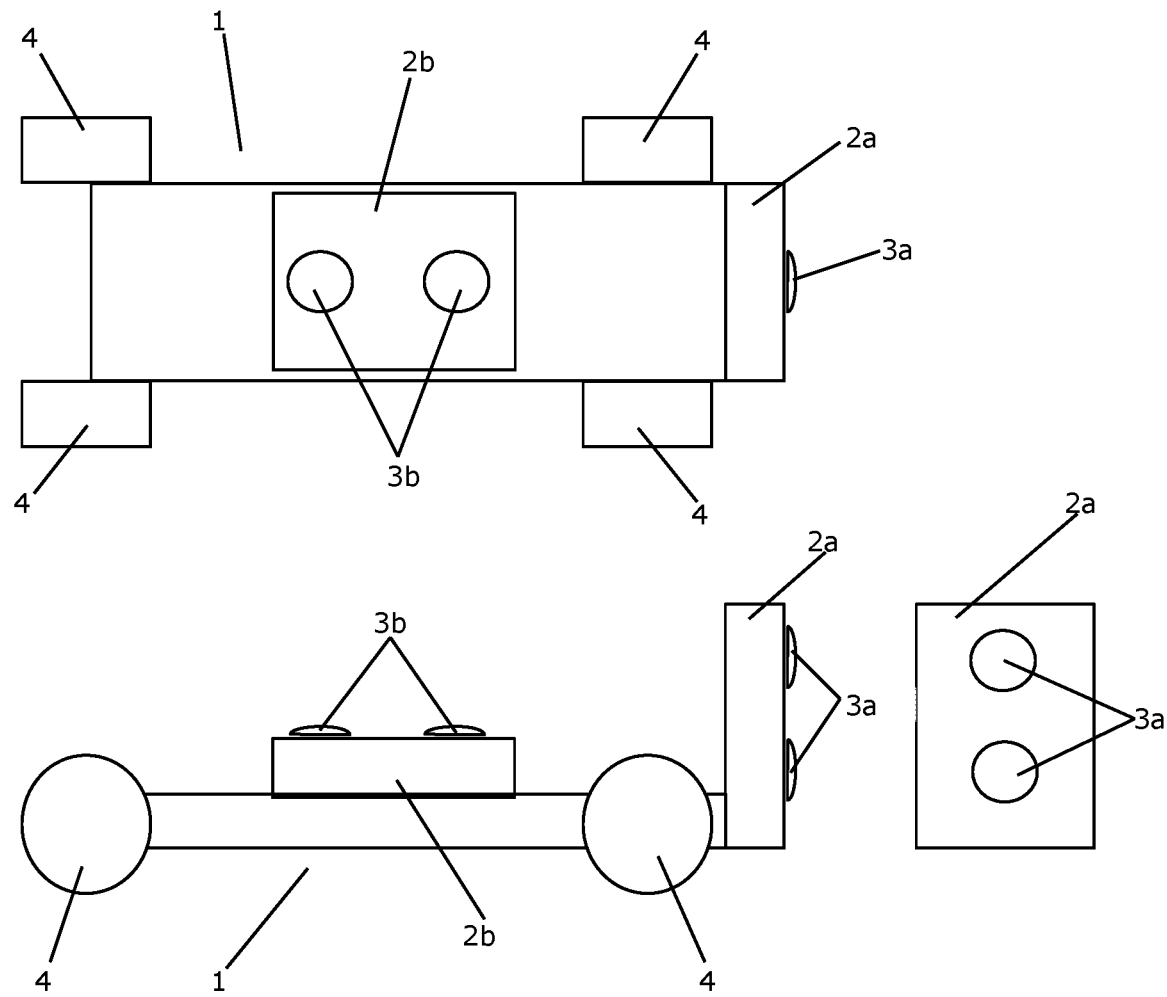

The inspection vehicle 1 of FIG. 15 is very similar to the inspection vehicle 1 of FIG. 12, and it will therefore not be described in detail here. However, in the inspection vehicle 1 of FIG. 15, the cameras 3a of the first perception module part 2a are arranged side by side along a substantially vertical direction, rather than side by side along a substantially horizontal direction. Three-dimensional images are still obtained in the manner described above with reference to FIG. 12.

Figure 16:
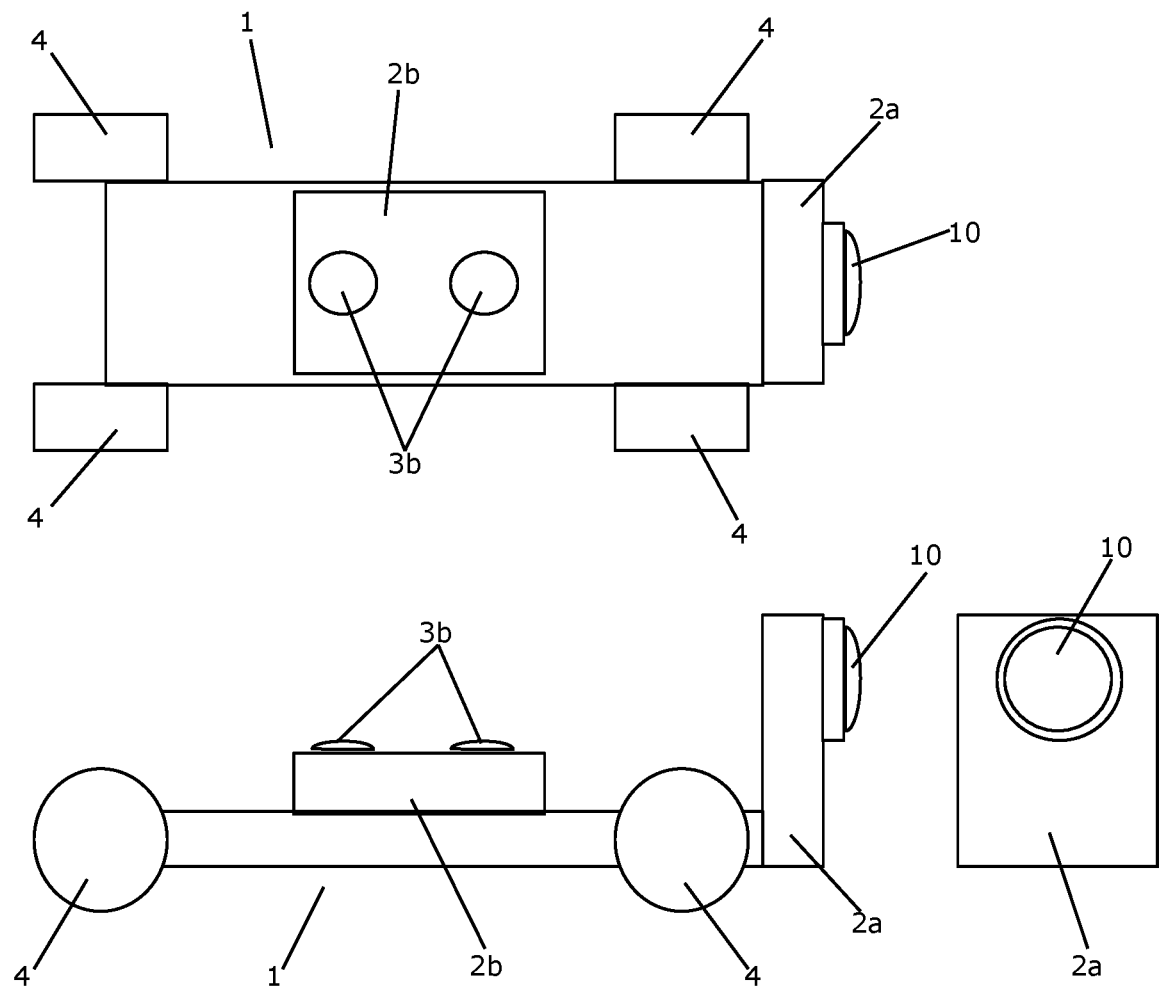

The inspection vehicle 1 of FIG. 16 is very similar to the inspection vehicle 1 of FIG. 14, and it will therefore not be described in detail here. However, in the inspection vehicle 1 of FIG. 16, the first perception module part 2a comprises a three-dimensional laser scanner 10 instead of a camera. Accordingly, three-dimensional images of the region in front of the inspection vehicle 1 are obtained by means of the three-dimensional laser scanner 10, e.g. by means of a structure-from-motion (SFM) technique as described above with reference to FIG. 14.

Figure 17:
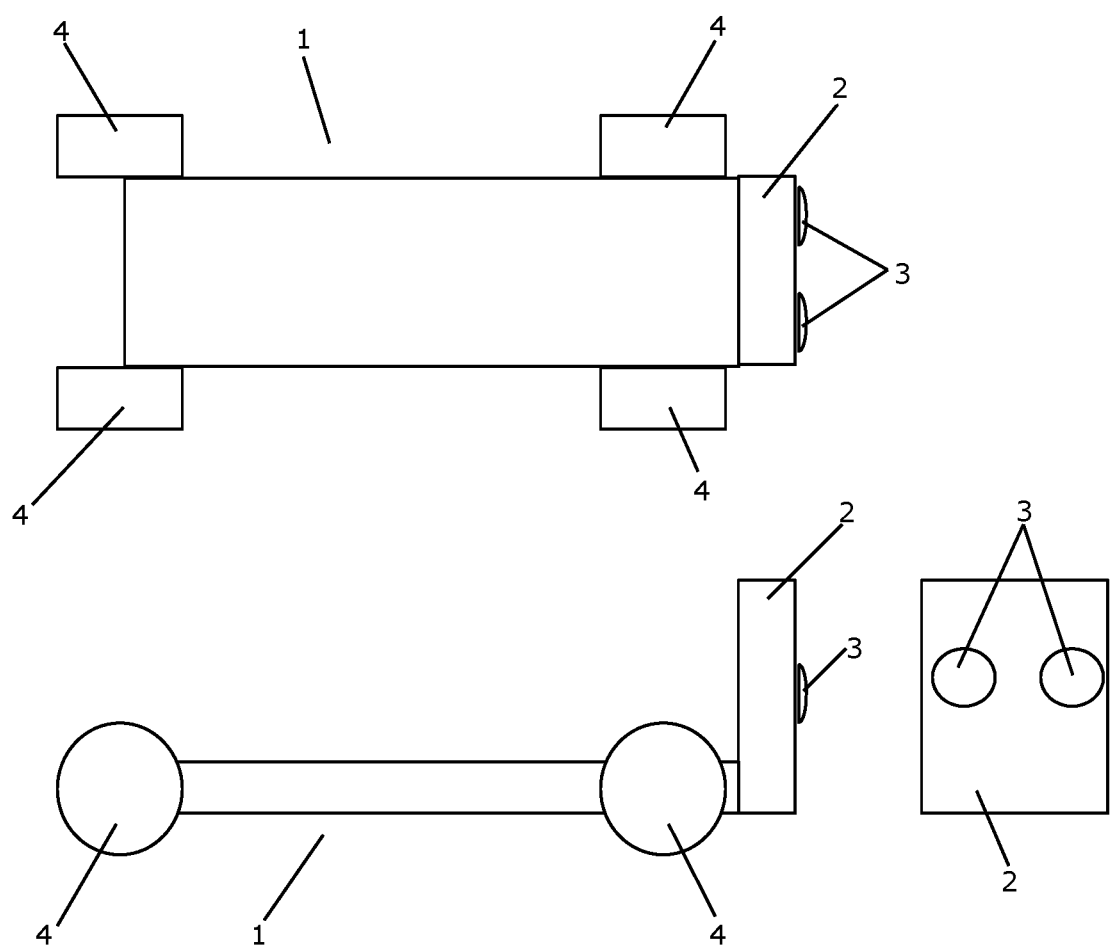

The inspection vehicle 1 of FIG. 17 is very similar to the inspection vehicle 1 of FIG. 12, and it will therefore not be described in detail here. However, the inspection vehicle 1 of FIG. 17 comprises only one perception module 2. The perception module 2 comprises two cameras 3 directed in a forward direction, and with parallel detection directions, similar to the cameras 3a of the first perception module part 2a of the inspection vehicle 1 of FIG. 12. Accordingly, three-dimensional images of the surroundings of the inspection vehicle 1 are obtained by means of the cameras 3 in the manner described above with reference to FIG. 12.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

The invention claimed is:

1. A method for obtaining a three-dimensional model of an inspection site, using a perception module, the perception module comprising a detection unit configured to obtain a three-dimensional image, the detection unit comprising at least a first camera and a second camera, the first camera having a first detection direction and a first viewing field, and the second camera having a second detection direction and a second viewing field, wherein the first detection direction and the second detection direction are fixed relative to each other, and wherein the first viewing field and the second viewing field define an overlapping zone, the method comprising the steps of:

obtaining at least one three-dimensional image by means of the detection unit by capturing images by means of the first camera and the second camera of the detection unit, and obtaining the three-dimensional image, based on the captured images, creating a three-dimensional model of surroundings of the perception module, based on the obtained three-dimensional image(s), comparing the created three-dimensional model and a plan of the inspection site and matching features of the created three-dimensional model and features of the plan of the inspection site, and forming a site-specific three-dimensional model of the inspection site, based on the created three-dimensional model and the plan of the inspection site, and based on the comparison, wherein the method further comprises the step of evaluating quality of the obtained three-dimensional image by performing the steps of:

capturing a first image and a second image by means of one of the cameras, the first image being captured at a first point in time and the second image being captured at a second point in time, where a time difference is defined between the first point in time and the second point in time, and where a relative movement between the perception module and the surroundings is taking place from the first point in time to the second point in time, identifying at least one feature present in the first image and in the second image, comparing a first position of the identified feature within the first image and a second position of the identified feature within the second image to an expected movement of the identified feature from the first point in time to the second point in time, corresponding to the relative movement between the perception module and the surroundings, and evaluating quality of the obtained three-dimensional image based on the comparison.

2. The method according to claim 1, wherein the first detection direction is non-parallel to the second detection direction, and wherein the step of obtaining at least one three-dimensional image comprises the steps of:

capturing images by means of the first camera and the second camera of the detection unit, transforming the captured images into images representing aligned detection directions of the cameras, and obtaining the three-dimensional image, based on the transformed images.

3. The method according to claim 1, wherein the detection unit further comprises at least a third camera having a third detection direction and a third viewing field, wherein the third detection direction is fixed relative to the first detection direction and to the second detection direction, wherein the third detection direction is non-parallel to the first detection direction and to the second detection direction, wherein the third viewing field defines an overlapping zone with the first viewing field and/or with the second viewing field, and wherein the step of obtaining a three-dimensional image is performed based on images captured by the first camera and the second camera, based on images captured by the first camera and the third camera, and/or based on images captured by the second camera and the third camera.

4. The method according to claim 1, further comprising evaluating quality of the obtained three-dimensional image by performing the steps of:
- determining a first contrast parameter within the overlapping zone of the image captured by means of the first camera,
- determining a second contrast parameter within the overlapping zone of the image captured by means of the second camera,
- comparing the first contrast parameter and the second contrast parameter, and
- evaluating quality of the obtained three-dimensional image based on the comparison.

5. The method according to claim 1, wherein the detection unit comprises a three-dimensional laser scanner, and wherein the step of obtaining a three-dimensional image is performed at least partly by means of the three-dimensional laser scanner.

6. The method according to claim 1, wherein the detection unit comprises at least one camera, and wherein the step of obtaining at least one three-dimensional image comprises the steps of:
- capturing at least two images by means of the camera, at points in time with a time difference defined between the points in time, and
- obtaining the three-dimensional image, based on the captured at least two images.

7. The method according to claim 1, wherein the step of creating a three-dimensional model of surroundings of the perception module comprises creating a three-dimensional point cloud.

8. The method according to claim 1, further comprising the step of evaluating quality of the created three-dimensional model, based on the comparison between the created three-dimensional model and the plan of the inspection site.

9. The method according to claim 1, further comprising the step of storing data obtained by means of the detection unit, and/or the obtained three-dimensional image and/or the created three-dimensional model in a storage device at the perception module.

10. The method according to claim 1, wherein the step of comparing the created three-dimensional model and a plan of the inspection site comprises identifying at least one feature in the three-dimensional model and matching the identified feature and a known feature in the plan of the inspection site.

11. The method according to claim 10, further comprising the step of detecting at least one mismatch between the created three-dimensional model and the plan of the inspection site.

12. The method according to claim 11, further comprising the step of forwarding information regarding the detected mismatch to an operator.

13. The method according to claim 1, wherein the step of forming a site-specific three-dimensional model of the inspection site comprises superimposing features of the three-dimensional model on matching features of the plan of the inspection site.

14. The method according to claim 1, further comprising the step of performing inspection of the inspection site, based on the site-specific three-dimensional model of the inspection site.

* * * * *